United States Patent [19]

Nakajima et al.

[11] Patent Number: 4,723,186
[45] Date of Patent: Feb. 2, 1988

[54] MAGNETIC HEAD SUPPORT ARM

[75] Inventors: Hiroyasu Nakajima; Hiroshi Daito, both of Odawara; Yokuo Saitoh, Kanagawa; Yuzo Yamaguchi, Tsuchiura, all of Japan

[73] Assignee: Hitachi, Ltd., Tokyo, Japan

[21] Appl. No.: 798,397

[22] Filed: Nov. 15, 1985

[30] Foreign Application Priority Data

Nov. 20, 1984 [JP] Japan ............... 59-243181

[51] Int. Cl.$^4$ .............................. G11B 21/21
[52] U.S. Cl. .............................. 360/104; 360/103
[58] Field of Search .............................. 360/103, 104

[56] References Cited

U.S. PATENT DOCUMENTS

| 3,931,641 | 1/1976 | Watrous | 360/104 |
| 4,167,765 | 9/1979 | Watrous | 360/104 |
| 4,408,238 | 10/1983 | Hearn | 360/104 |

FOREIGN PATENT DOCUMENTS

| 0025826 | 1/1984 | European Pat. Off. |
| 55-22296 | 2/1980 | Japan . |
| 60-127578 | 7/1985 | Japan ................... 360/104 |

Primary Examiner—Robert S. Tupper
Attorney, Agent, or Firm—Fay, Sharpe, Beall, Fagan, Minnich & McKee

[57] ABSTRACT

An improved magnetic head support mechanism intended for causing a magnetic head to float over a magnetic recording medium, comprises a spring member for retaining the magnetic head and a loading beam member provided with flanged portions along both longitudinal sides thereof and connected to the spring member at one end thereof and coupled to a shifting mechanism at the other end thereof and capable of giving the magnetic head an urging force to act on the magnetic recording medium. The loading beam member is penetratingly formed with at least one passing hole which permits the passing therethrough of an air stream generated by the rotational movements of the magnetic recording medium when the magnetic head is floating, so that it is possible to reduce the exciting force acting on the loading beam member and to thereby obtain the stabilized floating of the magnetic head.

2 Claims, 7 Drawing Figures

MAGNETIC HEAD SUPPORT ARM

FIELD OF THE INVENTION AND RELATED ART STATEMENT

The present invention relates to a magnetic head support mechanism and, more particularly, to a magnetic head support mechanism which, in a magnetic disk unit, is suitable for causing a magnetic head to float over a magnetic recording medium when said magnetic recording medium is rotating.

Among various kinds of existing magnetic head support mechanisms capable of floating a magnetic head over a magnetic recording medium when the medium is rotating, one type disclosed for instance in Japanese Patent Unexamined Publication No. 55-22296 and U.S. Pat. No. 4,167,765 is known as such constructed of a reduced number of components comprising, as will be seen in FIG. 5, a spring member 2 for retaining a magnetic head 1 and a loading beam member 3 connected to the spring member 2 at one end thereof and adapted to give the magnetic head 1 an urging force acting onto a magnetic recording medium (not shown).

In the above-noted support mechanism, the loading beam member 3 is formed with flanged portions 4, 4 in order to make it have stiffness.

The provision of such flanged portions 4, 4, however, during the floating of the magentic head 1, tends to cause a separation phenomenon, as is observed in FIG. 6, due to the impingement against the flanged portion 4 of an air stream Q generated by the rotational movements of the magnetic recording medium 20. Then, the upper air stream $Q_1$ generates a vortex $Q_3$ between two flanged portions 4, 4, by which the pressure between said flanged portions 4, 4 is lowered. Accordingly, the balance is lost between the lift caused by the lower air stream $Q_2$ and the urging force provided by the loading beam member 3 and the member 3 is subjected to a pressure drag F tending to proceed upwardly. Such pressure drag F increases and decreases as the region of vortex $Q_3$ varies, so that an exciting force acts on the loading beam member 3. The loading beam member 3 in turn is caused to oscillate with an enlarged amplitude. Therefore, the floating of the magnetic head 1 is necessarily rendered unstable and the mechanism has a danger of disturbing the recording signal and the reproducing signal of the magnetic head 1.

OBJECT AND SUMMARY OF THE INVENTION

Accordingly, considering the above circumstances, the present invention intends to provide a magnetic head support mechanism which enables the stabilized floating of the magnetic head and to thereby realize stabilization of the recording signal and the reproducing signal of the magnetic head.

To this end, according to the present invention, there is provided a magnetic head support mechanism in which a loading beam member is penetratingly formed with one or more holes adapted to permit the passing therethrough of part of an air stream which is generated by the rotational movements of a magnetic recording medium when a magnetic head is afloat.

DETAILED DESCRIPTION OF THE PREFERRED EMBODIMENT

An exemplary embodiment of the present invention will be fully described hereinafter with reference to FIG. 1 to FIG. 4 of the accompanying drawings.

Figure 1:
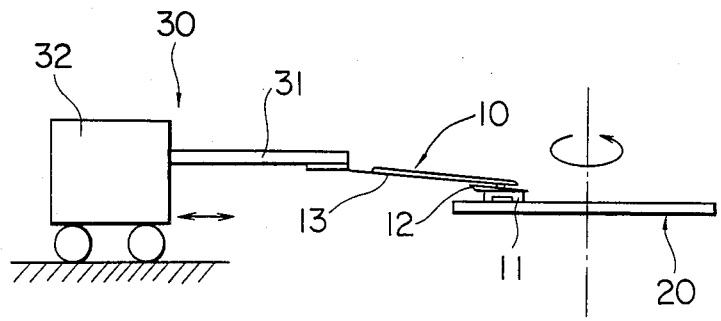
FIG. 1 is a front elevation of an embodiment in which a magnetic head support mechanism according to the present invention has been mounted to a magnetic disk unit.

In FIG. 1, there is shown an embodiment wherein a magnetic head support mechanism according to the present invention has been mounted to a magnetic disk unit. This magnetic disk unit is constructed such that a magnetic head support mechanism 10 is coupled to a shifting mechanism 30 which, as a magnetic recording medium 20 rotates, causes the magnetic head support mechanism 10 to move radially relative to the magnetic recording medium 20 so that a magnetic head 11 may be positioned as desired on said magnetic recording medium 20.

Figure 2:
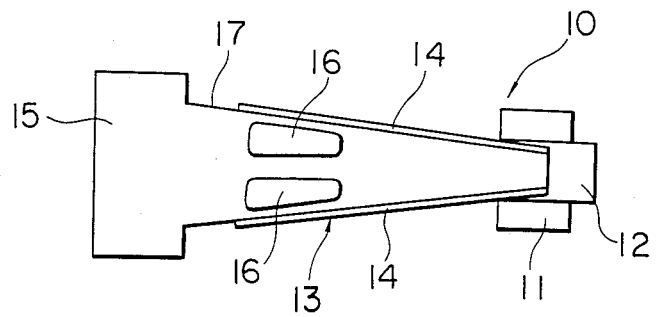
FIG. 2 is a plan view of the magnetic head support mechanism shown in FIG. 1.
Figure 3:
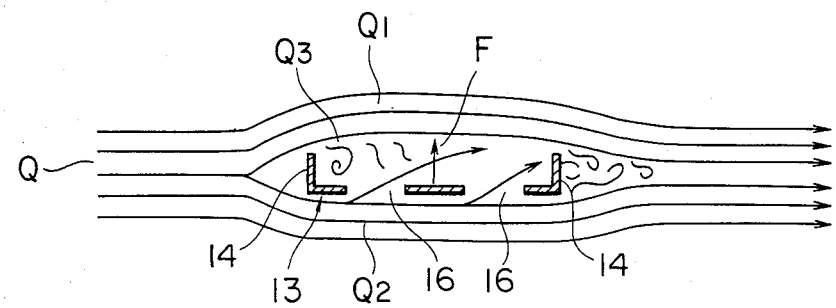
FIG. 3 is a sectional view for explaining the action of an air stream on a loading beam member of the invention.

As is seen in FIG. 2, the magnetic head support mechanism 10 has a spring member 12 for retaining the magnetic head 11 and a loading beam member 13 having the spring member 12 mounted to one end thereof.

The spring member 12, though not fully illustrated in the drawing, is consisted of a leaf spring generally bent to define a V-shaped configuration and retains on one end thereof the magnetic head 11 for the writing and reading of data on and from the magnetic recording medium 20.

The loading beam member 13 is constituted of a flat trapezoidal sheet having a width gradually increased from one end thereof to the other end thereof and is formed along both longitudinal sides thereof with flanged portions 14, 14 for providing proper stiffness for said loading beam member 13. The flanged portions 14, 14 are bent upwardly along both longitudinal side edges of the loading beam member 13 from one end thereof toward the other end thereof.

Further, the loading beam member 13, which has one end thereof secured to the other end of the spring member 12 and has the other end thereof coupled to the shifting mechanism 30, is adapted to cause the magnetic head 11 to exert an urging force onto the magnetic recording medium 20. For this purpose, the loading beam member 13 is constituted of for instance stainless steel or the like which provides such urging force.

In the shifting mechanism 30, an extension 15 which extends from the other end of the loading beam member 13 is connected to a guide arm 31 at one end of the guide arm 31 and the guide arm 31 in turn is mounted at the other end thereof to a carriage 32, which, by means of a driving means (not shown) is capable of shifting the loading beam member 13 in the radial direction of the magnetic recording medium 20. As will be understood, the magnetic recording medium 20 is constituted of a magnetic disk.

In its normal operational mode, the magnetic head support mechanism 10 of the invention works to cause the magnetic head 11 to come in contact with the magnetic recording medium 20, and when the magnetic recording medium 20 has attained its predetermined number of rotations, the force of an air stream Q generated by the rotational movements of the medium 20 come balanced with the urging force from the loading beam member 13, so that the magnetic head 11 is caused to float over the magnetic recording medium 20 and thus enabled to conduct the reading and writing of data. To this end, the urging force of the loading beam member 13 is predetermined in size so as to balance with the lift caused by the rotational movements of the magnetic recording medium 20 and to enable the magnetic head 11 to float just at the time of said magnetic recording medium 20 having attained its predetermined number of rotations.

Moreover, according to the present invention, the loading beam member 13 is penetratingly formed with one or more passing holes 16 which, when the magnetic head 11 floats, permit the passing therethrough of the air stream Q caused by the rotational movements of the magnetic recording medium 20. More particularly, the passing holes 16 are penetratingly provided on the loading beam member 13 so as to extend from its longitudinally central part toward its other end and to be interposed between two flanged portions 14, 14. In the preferred embodiment, a pair of rectangular holes 16 are provided confronting each other for instance by means of an etching procedure or the like. These passing holes 16 are arranged such that if a separation phenomenon is generated by the impingement of the air stream against the flanged portion 14 during the floating of the magnetic head 11, the lower air stream is allowed to pass upwardly through the holes 16 so that the oscillations of the loading beam member 13 may be reduced.

In this construction, however, there exists the possibility of reducing the mechanical strength of the loading beam member 13. Considering such possibility, in the preferred embodiment, each passing hole 16 is rounded at four corners thereof and also the rear part of the hole is located substantially spaced apart from the lateral edge 17 on the side of the extremity of the flanged portion 14, thereby assuring the retention of the mechanical strength of the loading beam member 13. Thus, it will be apparent that the passing hole 16 may take any configuration as desired providing it permits the passing of the air stream through the hole and enables the loading beam member 13 to maintain the strength thereof.

Now, hereinafter, the operation of the magnetic head support mechanism according to the above-noted construction will be described.

When the magnetic recording medium 20 is rotating and the magnetic head 11 is floating over said magnetic recording medium 20, the air stream Q generated by the rotational movements of the magnetic recording medium 20 acts transversally relative to the longitudinal direction of the loading beam member 13, so that said air stream Q impinges onto the flanged portion 14 of the loading beam member 13 to thereby generate a separation phenomenon and consequently the upper air stream $Q_1$ induces a vortex $Q_3$ between the flanged portions 14, 14, whereby the loading beam member 13 tends to be acted by violent oscillations.

However, thanks to the provision of the passing holes 16 in the loading beam member 13, the lower air stream $Q_2$ is forced to pass through said passing holes 16 to thereby narrow the region of the vortex $Q_3$ and also prevent the pressure drop between the flanged portions 14, 14, so that the pressure drag F which the loading beam member 13 will be subjected to can be greatly reduced, and such reduction in turn results in the substantial reducing of the exciting force to be exerted onto the loading beam member 13. The extent of the reducing of the exciting force is selected in size such that the resultant oscillational amplitude of the loading beam member 13 may be acceptable for the practical use thereof.

Figure 4:
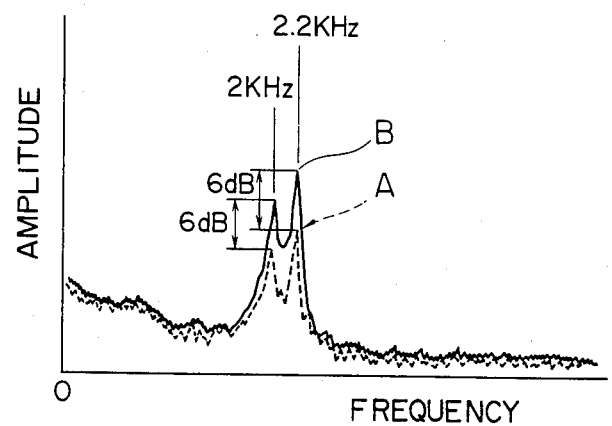
FIG. 4 is a graph depicting the oscillation characteristics of the loading beam member when the magnetic head is afloat.
Figure 5:
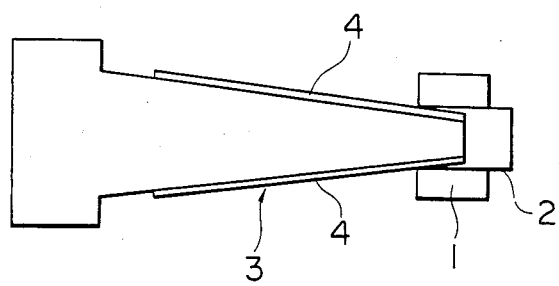
FIG. 5 is a plan view showing an example of conventional constructions for magnetic head support mechanisms.
Figure 6:
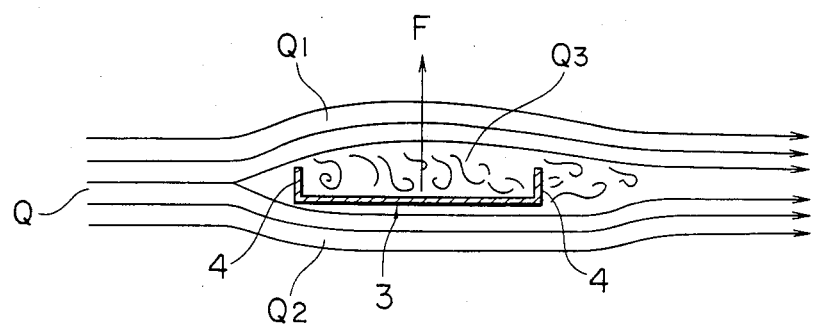
FIG. 6 is a sectional view for explaining the action of an air stream on a loading beam member of a conventional construction.

Turning now to FIG. 4, there are shown the data actually measured of the reducing effects of the exciting forces. More particularly, FIG. 4 illustrates the oscillation characteristics of the loading beam member 13 when the magnetic head 11 is on the float. In FIG. 4, the axis of abscissa indicates thereon the oscillation frequencies at intervals of 0–5 KHz while the axis of ordinate indicates thereon oscillation amplitudes, those in the case of the preferred embodiment being indicated by a dashed curved line A while those in the case of a conventional construction being indicated by a continuous line B. According to the plotting shown, it is apparently observed that the oscillation amplitudes have been reduced about 6 db when comparing the dashed curved line A (the preferred embodiment) with the continuous curved line B (a conventional example).

Further, the passing holes 16 are positioned between the flanged portions, so the member 13 is not likely to have its strength deteriorated and thus capable of fully enduring the operation thereof.

Figure 7:
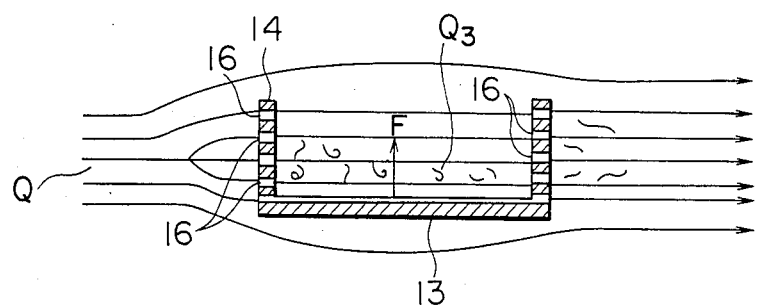
FIG. 7 is a sectional view of a modified type of a loading beam member used in an alternative embodiment according to the present invention.

Next, a modified embodiment of the invention will be explained with reference to FIG. 7.

In this alternative embodiment, air stream passing holes 16 are penetratingly formed on the flanged portions 14, 14 of the loading beam member 13. When an air stream Q impinges on the loading beam member 13 at the flanged portion 14, part of the stream Q is caused to pass through a plurality of passing holes 16 provided on the flanged portion 14, so that generation of vortex can substantially be deterred. Accordingly, the pressure drag F which the loading beam member 13 will be subjected to can be reduced and therefore it is possible to reduce the exciting force acting on the loading beam member 13, as is the case with the first embodiment described above.

As has been disclosed in the foregoing, the present invention contemplates an improved construction wherein a loading beam member is provided with one or more passing holes adapted for passage therethrough of an air stream generated by the rotational movements of a magnetic recording medium, and the exciting force acting on the loading beam can be reduced by the air stream passing through the hole or holes, so that a magnetic head can be kept stable while floating. According to the present invention, therefore, the magnetic head is capable of being supported reliably by means of quite a simple construction which requires no particular parts for it. This, as a result, contributes to the stabilization of signals with respect to the recording and reproducing thereof and at the same time provides an additional effect of curbing a steep rise in the production cost.

What is claimed is:

1. A magnetic head support mechanism for causing a magnetic head to float over a magnetic recording medium during rotation of the magnetic recording medium past the magnetic head for recording and reproducing operations thereof, the support mechanism comprising:
- a spring member for retaining the magnetic head;
- a loading beam member provided with flanged portions along both longitudinal sides thereof and connected to the spring member at one end thereof and coupled to a shifting mechanism at the other end thereof, and capable of giving the magnetic head an urging force to act on the magnetic recording medium; and
- said loading beam member being penetratingly formed with at least one passing hole penetratingly provided on the flanged portions of said loading beam member for permitting the passing therethrough of an air stream generated by the rotational movements of said magnetic recording medium when said magnetic head is floating.

2. A magnetic head support mechanism as defined in claim 1, wherein said loading beam member is made of a flat trapezoidal sheet having a width gradually increased from said one end thereof on which the spring member is mounted to said other end thereof and is provided with the flanged portions formed by bending up the sheet along the major length of both side portions thereof.

* * * * *